United States Patent
Ko et al.

(10) Patent No.: US 10,972,460 B2
(45) Date of Patent: Apr. 6, 2021

(54) SECURE SEMICONDUCTOR CHIP AND OPERATING METHOD THEREOF

(71) Applicant: INDUSTRY-UNIVERSITY COOPERATION FOUNDATION HANYANG UNIVERSITY, Seoul (KR)

(72) Inventors: Hyoung Ho Ko, Daejeon (KR); Byong Deok Choi, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 226 days.

(21) Appl. No.: 16/076,510

(22) PCT Filed: Feb. 10, 2017

(86) PCT No.: PCT/KR2017/001492
§ 371 (c)(1),
(2) Date: Oct. 29, 2018

(87) PCT Pub. No.: WO2017/138774
PCT Pub. Date: Aug. 17, 2017

(65) Prior Publication Data
US 2019/0042532 A1 Feb. 7, 2019

(30) Foreign Application Priority Data

Feb. 12, 2016 (KR) .................. 10-2016-0016587
Feb. 10, 2017 (KR) .................. 10-2017-0018693

(51) Int. Cl.
*H04L 29/06* (2006.01)
*G06F 21/55* (2013.01)
(Continued)

(52) U.S. Cl.
CPC ...... *H04L 63/0869* (2013.01); *G06F 15/7807* (2013.01); *G06F 15/7842* (2013.01);
(Continued)

(58) Field of Classification Search
CPC ... H04L 63/0869; H04L 9/321; H04L 9/3263; H04L 9/3278; H04L 2209/12; G06F 15/7807; G06F 15/7842; G06F 15/7853; G06F 21/55; G06F 21/556; G06F 21/57; G06F 21/60; G06F 21/602; G06F 21/74;
(Continued)

(56) References Cited

U.S. PATENT DOCUMENTS

| | | | | |
|---|---|---|---|---|
| 7,831,873 | B1 * | 11/2010 | Trimberger | G01K 7/32 714/725 |
| 2004/0117693 | A1 | 6/2004 | Moriyama et al. | |
| 2005/0212565 | A1 * | 9/2005 | Bogdan | H03L 7/07 327/105 |
| 2006/0250239 | A1 * | 11/2006 | Melton | G06F 21/755 340/568.2 |

(Continued)

*Primary Examiner* — Jayesh M Jhaveri

(57) ABSTRACT

A semiconductor chip may comprise: a processor for processing data; a shield which includes a metal line and is arranged over an upper portion of the processor; a detection unit for comparing a reference signal with an output signal, which is outputted when the reference signal passes through the shield, so as to detect whether there has been a wiring change within the shield or not; and a controller for configuring the routing topology of the metal line to be in a first state, and changing the routing topology from the first state to a second state.

8 Claims, 6 Drawing Sheets

(51) Int. Cl.
| | |
|---|---|
| *G06F 15/78* | (2006.01) |
| *G06F 21/60* | (2013.01) |
| *G06F 21/74* | (2013.01) |
| *G06F 21/85* | (2013.01) |
| *H04L 9/32* | (2006.01) |
| *G06K 19/073* | (2006.01) |
| *G06F 21/57* | (2013.01) |
| *G06Q 20/34* | (2012.01) |

(52) U.S. Cl.
CPC ......... *G06F 15/7853* (2013.01); *G06F 21/55* (2013.01); *G06F 21/556* (2013.01); *G06F 21/57* (2013.01); *G06F 21/60* (2013.01); *G06F 21/602* (2013.01); *G06F 21/74* (2013.01); *G06F 21/85* (2013.01); *G06K 19/07372* (2013.01); *G06Q 20/341* (2013.01); *H04L 9/321* (2013.01); *H04L 9/3263* (2013.01); *H04L 9/3278* (2013.01); *G06F 2221/2149* (2013.01); *H04L 2209/12* (2013.01)

(58) Field of Classification Search
CPC ............ G06F 21/85; G06F 2221/2149; G06K 19/07372; G06Q 20/341
See application file for complete search history.

(56) References Cited

U.S. PATENT DOCUMENTS

| | | | |
|---|---|---|---|
| 2009/0024890 | A1 | 1/2009 | Cutrignelli et al. |
| 2010/0187525 | A1* | 7/2010 | Bartley ................... G06F 21/87 257/48 |
| 2012/0056639 | A1* | 3/2012 | Oomura ................... H03K 5/19 324/762.03 |
| 2014/0191781 | A1* | 7/2014 | Guvenc ................... G06F 21/60 326/8 |
| 2014/0353849 | A1 | 12/2014 | Arora et al. |
| 2015/0161415 | A1* | 6/2015 | Kreft ................... H04L 63/0442 713/194 |
| 2019/0385957 | A1* | 12/2019 | Lisart ...................... G06F 21/86 |

* cited by examiner

SECURE SEMICONDUCTOR CHIP AND OPERATING METHOD THEREOF

CROSS-REFERENCE TO RELATED APPLICATIONS

This application is a National Stage Entry of PCT International Application No. PCT/KR2017/001492, which was filed on Feb. 10, 2017, and which claims priority from Korean Patent Application No. 10-2016-0016587 filed with the Korean Intellectual Property Office on Feb. 12, 2016, and Korean Patent Application No. 10-2017-0018693 filed with the Korean Intellectual Property Office on Feb. 10, 2017. The disclosures of the above patent applications are incorporated herein by reference in their entirety.

BACKGROUND

1. Technical Field

The present invention relates to a semiconductor chip having increased security and a method for operating the same, more particularly to the detection of physical attacks against the semiconductor chip.

2. Description of the Related Art

Various physical attacks and software attacks on semiconductor chips pose a threat against products using SoC (system-on-chip) technology and application services based on such products. There are various known examples of physical attacks, such as depackaging, circuit deformation using a FIB (focused ion beam), micro-probing, power analysis, EMA (electromagnetic analysis), fault injection using voltage, frequency, or temperature alterations, etc.

Techniques for detecting physical attacks and protecting the circuit have been introduced, and the prior art documents provided below, for example, allow an understanding of previous attempts.

Korean Registered Patent No. 10-1299602 (published Aug. 26, 2013) presents a method of comparing a first result obtained by transmitting a random reference signal through an active shield with a second result obtained by transmitting directly with a comparison logic to detect whether or not reverse engineering occurred in the shield.

The technological document "A Highly time sensitive XOR gate for probe attempt detectors" (S. Manich, et al., IEEE Trans. Circuits Syst., II: Exp. Briefs, vol. 60, no. 11, pp. 786-790, November 2013) presents a technique of detecting a probing capacitance delay, which occurs when a semiconductor chip is depackaged and the data bus within is probed.

SUMMARY OF THE INVENTION

An aspect of the invention is to provide a secure semiconductor chip capable of detecting physical attacks as well as to an operating method for the secure semiconductor chip.

One aspect of the invention provides a semiconductor chip which can include: a processor configured to process data; a shield that is arranged over an upper portion of the processor and includes a metal line; a detection unit that detects whether or not there is a wiring change in the shield by comparing a reference signal with an output signal, which is obtained as the reference signal is outputted after passing through the shield; and a controller that configures the routing topology of the metal line to a first state and configures the routing topology to a second state changed from the first state.

According to an embodiment of the invention, the semiconductor chip can further include a random number generator that provides a configuration signal, which causes the controller to configure the routing topology. More specifically, the controller can include at least one chopper array that is capable of changing the routing topology according to the configuration signal provided by the random number generator.

According to another embodiment of the invention, the random number generator can randomly change the configuration signal periodically according to time so that the controller continuously changes the routing topology. Also, the reference signal can be a signal created by the random number generator separately from the configuration signal.

According to yet another embodiment of the invention, the reference signal can include a first input signal and a second input signal that are generated independently from each other, and the detection unit can detect whether or not there is a wiring change in the shield by comparing a first output signal and a second output signal with the first input signal and the second input signal, where the first output signal and the second output signal are obtained as the first input signal and the second input signal outputted after passing through the shield, respectively.

According to still another embodiment of the invention, the detection unit can detect whether or not there is a wiring change in the shield by comparing the first input signal with either one of a first output signal and a second output signal, which are outputted from different ports, according to the routing topology of the metal line.

According to another embodiment of the invention, the controller can match each of the at least one chopper array with a pre-designated bit within the configuration signal and can change the routing topology by using a corresponding chopper array according to a change in the matched bit value.

Another aspect of the invention provides a semiconductor chip which can include: a processor configured to process data; a shield that is arranged over an upper portion of the processor and includes a metal line; a ring oscillator block configured to pass an output of a first ring oscillator through a first area of the shield and return it to an input of the first ring oscillator and configured to pass an output of a second ring oscillator, which is synchronized with the first ring oscillator, through a second area of the shield and return it to an input of the second ring oscillator; and a detection unit configured to detect whether or not there is an electrical probing of the shield by comparing the oscillation phases of the first ring oscillator and the second ring oscillator.

According to an embodiment of the invention, the semiconductor chip can have the transmission paths of the first ring oscillator parallelized in the first area and the transmission paths of the second ring oscillator parallelized in the second area.

According to another embodiment of the invention, the detection unit can transfer a reset signal to the ring oscillator block to periodically synchronize the first ring oscillator and the second ring oscillator. Also, the first ring oscillator and the second ring oscillator can generate clock signals having the same phase according to the reset signal.

Still another aspect of the invention provides a semiconductor chip that can include: a processor configured to process data; a shield that is arranged over an upper portion of the processor and includes a metal line; a detection unit configured to detect whether or not there is at least one of a wiring change in the shield and an electrical probing of the shield; and a controller configured to select either one of a first mode for detecting a wiring change in the shield and a second mode for detecting an electrical probing of the shield and transfer a signal corresponding to the selected mode to the detection unit.

According to an embodiment of the invention, if the first mode is selected, the controller can set a routing topology of the metal line to a first state and set the routing topology to a second state changed from the first state, and the detection unit can detect whether or not there is a wiring change in the shield by comparing a transferred reference signal with an output signal, which is obtained as the reference signal outputted after passing through the shield.

According to another embodiment of the invention, the semiconductor chip can further include: a ring oscillator block configured to pass an output of a first ring oscillator through a first area of the shield and return it to an input of the first ring oscillator and configured to pass an output of a second ring oscillator, which is synchronized with the first ring oscillator, through a second area of the shield and return it to an input of the second ring oscillator, where, if the second mode is selected, the controller can provide control such that output signals from the first ring oscillator and the second ring oscillator each passes through a corresponding area to be transferred to the detection unit.

The present invention makes it possible to detect physical attacks such as those based on a FIB method, a micro-probing method, a forcing method, etc.

DETAILED DESCRIPTION OF THE INVENTION

Figure 1:
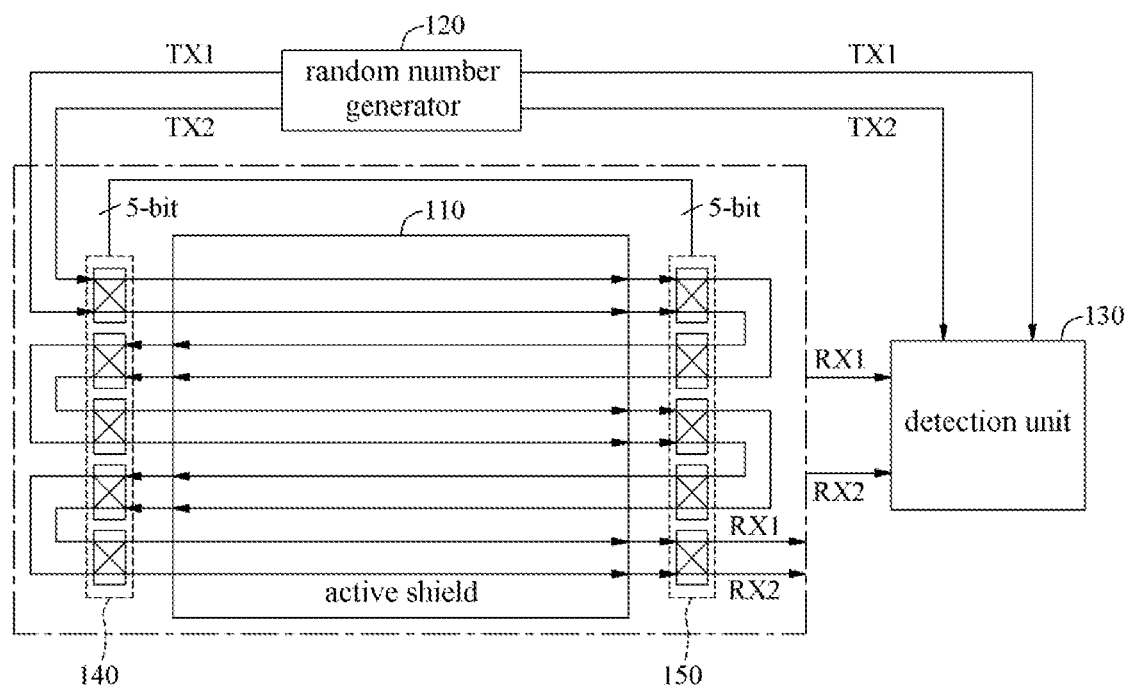
FIG. 1 is a diagram illustrating an example of a circuit for detecting a wiring change in a semiconductor chip according to an embodiment of the invention.

The descriptions of specific structural or functional elements of the embodiments are provided merely for illustrative purposes, and the embodiments can be practiced in various modified forms. Thus, the embodiments are not limited to the specific disclosed forms, and the scope of the present specification includes modifications, equivalents, or substitutes encompassed within the technical spirit.

While such terms as "first" and "second", etc., can be used to describe various elements, such elements are to be interpreted only as distinguishing one element from another. For example, a first element can be referred to as a second element, and similarly a second element can be referred to as a first element.

When an element is mentioned as being "connected" to another element, it should be understood that the element can be directly connected or joined to the other element but can also have yet another element interposed therebetween.

An expression used in the singular encompasses the expression of the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

Unless defined otherwise, all terms used herein, including technical or scientific terms, have the same meanings as those generally recognized by the person having ordinary skill in the relevant field of art. Terms such as those that are defined in generally used dictionaries are to be interpreted as having meanings that agree with the context of the relevant technology and are not to be interpreted as having idealistic or excessively formal meanings unless clearly defined within the specification.

Certain embodiments of the invention are described below in more detail with reference to the accompanying drawings. In referring to the accompanying drawings, the same reference numerals are assigned for the same elements regardless of the figure number, and redundant descriptions relating thereto are omitted.

Physical Attacks on a Semiconductor Chip

To an integrated circuit used in an IC (integrated circuit) card, etc., attackers may reverse engineer the integrated circuit, arbitrarily change the operation mode of the circuit by using acquired information, or manipulate the data stored in the memory. There is a possibility that an attack on a semiconductor chip such as those listed above may incur real problems such as those involving the hacking of important data or disabling entrance security.

Attackers can perform attacks on the integrated circuit after bypassing the shield in the integrated circuit by using a method such as a FIB (focused ion beam) method, a micro-probing method, and a forcing method, for example. To be more specific, a FIB method refers to a method of arbitrarily shorting or connecting metal lines by using an ion beam. A micro-probing method refers to a method of reading the state value of a particular metal line. Forcing refers to an attack that entails manipulating data by cutting a particular metal line with the FIB method and providing a particular manipulated signal to the cut metal line.

In the following, various embodiments are presented for a secure semiconductor chip that detects a physical attack in the event of such physical attack, where examples of the physical attack may include, but is not limited to, a wiring change of the semiconductor chip and a micro-probing attack.

Implementation of a Secure Semiconductor Chip According to an Embodiment

FIG. 1 is a diagram illustrating an example of a circuit for detecting a wiring change in a semiconductor chip according to an embodiment of the invention. Referring to FIG. 1, the semiconductor chip can include an active shield 110, a random number generator (RNG) 120, a detection unit (detection logic) 130, a first chopper array 140, and a second chopper array 150. Reference numeral 160 can represent an area of the active shield 110 in which paths can be reconfigured arbitrarily. The active shield 110 can include metal lines that protect against attacks made to the semiconductor chip involving reverse engineering by outside attackers.

The random number generator 120 can transmit a randomly generated bit stream to a pre-designated circuit. In an embodiment of the invention, the random number generator 120 can transfer a first input signal TX1 and a second input signal TX2, generated randomly, as reference signals to the detection unit 130 and the first chopper array 140. In another embodiment of the invention, the random number generator 120 can transfer configuration signals corresponding to preset bit numbers to the respective chopper arrays 140, 150.

Although, in the descriptions below, an embodiment is illustrated in which configuration signals of 5 bits are transferred to each of the first chopper array 140 and the second chopper array 150 in the same manner, this is merely an example intended for aiding the understanding of the reader and is not to be interpreted as restricting or limiting the scope of other embodiments. For instance, it would be conceivable to have the random number generator 120 transfer a 10-bit first configuration signal to the first chopper array 140 and transfer a 10-bit second configuration signal to the second chopper array 150, or have the random number generator 120 transfer identical 4-bit configuration signals to the first chopper array 140 and second chopper array 150.

The detection unit 130 can detect whether or a wiring change is present in the active shield 110 through a method of comparing the reference signals TX1, TX2 transferred directly from the random number generator 120 with the output signals RX1, RX2 outputted after passing through the metal lines in the active shield 110.

In an embodiment of the invention, the detection unit 130 can determine that there were no wiring changes in the semiconductor chip if the two reference signals TX1, TX2 are the same as their respectively corresponding output signals RX1, RX2. In another embodiment of the invention, the detection unit 130 can determine that a wiring change is present in the semiconductor chip if at least one of the two reference signals TX1, TX2 is different from its corresponding output signal RX1, RX2 and can output a detection signal (detect out). The procedures by which the detection unit detects a wiring change made to the semiconductor chip are described below in further detail, with reference to a block diagram of the semiconductor chip.

Figure 2A:
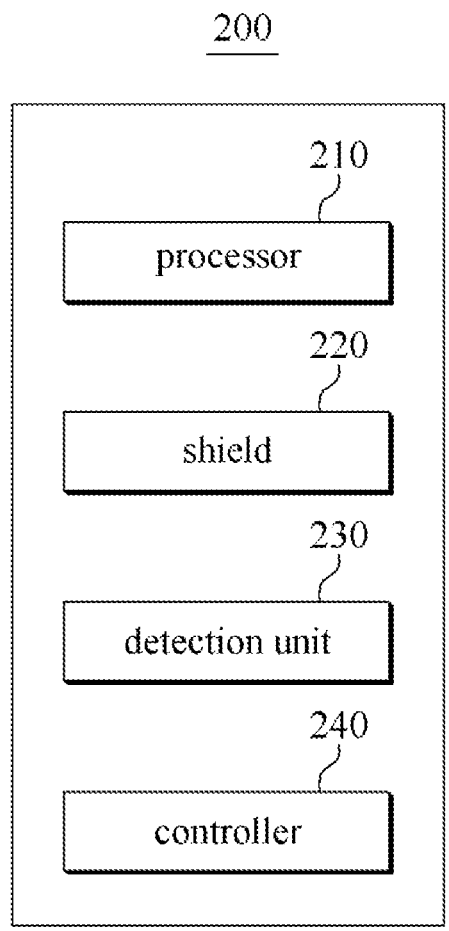
FIG. 2A is a block diagram of the semiconductor chip illustrated in FIG. 1.

FIG. 2A is a block diagram of the semiconductor chip illustrated in FIG. 1. Referring to FIG. 2A, the semiconductor chip 200 can include a processor 210, a shield 220, a detection unit 230, and a controller 240. The processor 210 can process data related to the semiconductor chip 200. Attackers from the outside would want to manipulate or seize the data processed by the processor 210 through physical attacks on the semiconductor chip 200. The shield 220 can include metal lines and can be arranged over an upper portion of the processor 210 to protect the processor 210. In an embodiment of the invention, the shield 220 can be implemented in the form of an active shield that includes multiple metal lines.

The detection unit 230 can detect whether or not there is a wiring change in the shield by comparing the reference signal with an output signal, which is the reference signal outputted after passing through the shield 220.

Also, the controller 240 can configure the routing topology of the metal lines to a first state and can change the routing topology from the first state to a second state. In the descriptions below, the routing topology can represent the connection relationships related to the path through which a reference signal passes through the metal lines in the shield 220 and are outputted. For instance, if the routing topology is in a first state, the reference signal can be outputted to the detection unit 230 by passing through a first path, and if the routing topology is in a second state, the reference signal can be outputted to the detection unit 230 by passing through a second path.

Although it is not shown in FIG. 2A, the semiconductor chip 200 can further include a random number generator that provides a configuration signal which causes the controller 240 to configure the routing topology. The random number generator can provide a bit stream having a pre-designated bit number as the configuration signal to the controller 240 according to preset time periods. Also, the random number generator can randomly change the configuration signal periodically according to time, causing the controller 240 to continuously change the routing topology.

In an embodiment of the invention, the controller 240 can include at least one chopper array that is capable of changing the routing topology according to the configuration signal provided by the random number generator. In the descriptions below, a chopper array can be a circuit that includes at least one switching converter and can refer to a circuit that alters the path of the outputted signal according to the current or voltage inputted.

In one example, the controller 240 can include a first chopper array arranged at the input end of the shield 220 and a second chopper array arranged at the output end of the shield 220. In an embodiment of the invention, the random number generator can provide the same configuration signal to the first chopper array and the second chopper array. In this case, the first chopper array and the second chopper array can have the routing topology changed in the same manner. In another embodiment, the random number generator can provide an arbitrarily generated first configuration signal to the first chopper array and provide a second configuration signal differentiated from the first configuration signal to the second chopper array. The first configuration signal and the second configuration signal can have the same bit number but can be different signals. In this case, the routing topologies associated with the first chopper array and the second chopper array can be changed independently from each other.

The controller 240 can match each of the at least one chopper array with a pre-designated bit of the configuration signal provided by the random number generator. Also, the controller 240 can change the routing topology by controlling the chopper array corresponding to the change in the matched bit value.

Also, the random number generator can generate a reference signal separately from the configuration signal and can provide the reference signal to the detection unit 230 and the controller 240. More specifically, the random number generator can generate as the reference signals a first input signal TX1 and a second input signal TX2, which can be generated independently from each other. Also, the random number generator can transfer each of the first input signal TX1 and the second input signal TX2 to the detection unit 230 and the controller 240. The controller 240 can, according to the current routing topology, pass the first input signal TX1 through a first path within the shield 220 and pass the second input signal TX2 through a second path within the shield 220.

The detection unit 230 can detect whether or not there is a wiring change in the shield by comparing a first output signal RX1, which is outputted after passing through the first path, and a second output signal RX2, which is outputted after passing through the second path, with the first input signal TX1 and the second input signal TX2, respectively. In an embodiment of the invention, the detection unit 230 can detect whether or not there is a wiring change in the shield 220 by comparing the first input signal TX1 with the first output signal RX1 and comparing the second input signal TX2 with the second output signal RX2.

In another embodiment of the invention, the detection unit 230 can detect whether or not there is a wiring change in the shield 220 by comparing the first input signal TX1 with the second output signal RX2 outputted from a different port and comparing the second input signal TX2 with the first output signal RX1 according to the routing topology of the metal lines.

A semiconductor chip according to this embodiment can periodically change the routing topology of the metal lines in the shield 220 through which the reference signals pass. As a result, if there is a wiring change in a particular area in the shield 220, it can be recognized that a wiring change has occurred in a designated path, whereby it is possible to determine the wiring change area more accurately compared to existing methods.

Figure 2B:
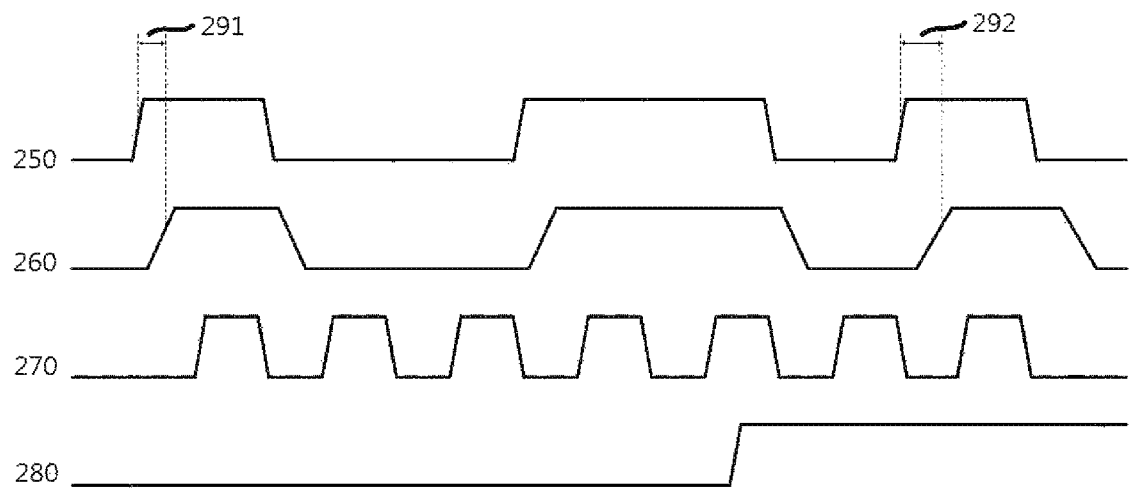
FIG. 2B is a diagram illustrating an example of detecting a wiring change made to a semiconductor chip by comparing a reference signal with the output signal of the shield.

FIG. 2B is a diagram illustrating an example of detecting a wiring change made to a semiconductor chip by comparing a reference signal with the output signal of the shield. In FIG. 2B, there are illustrated a reference signal 250, an output signal 260, a clock signal 270, and an attack signal 280, measured along the same time axis. The detection unit 230 can detect whether or not a transmission path has been changed by comparing the reference signal 250, which is transferred directly from the random number generator, with the output signal 260, which is transferred through the shield 220.

Also, the detection unit 230 can compare the time delay between the rising edges or falling edges, i.e. the points at which the values change, of the reference signal 250 and the output signal 260, so as to measure the delay ($t_r$) 291 between the two signals in a normal state when there are no attacks. Consequently, if a delay ($t_{ra}$: rising time when attacked) 292 is detected that has been changed by an attack, as compared with the delay ($t_r$) 291 in a normal state, then the detection unit 230 can determine that an attack such as a wiring change has occurred. For example, in cases where the delay ($t_r$) 291 between the reference signal 250 and the output signal 260 is kept at about 10 ns in a normal state, the occurrence of a physical attack signal 280 such as from a probing attack can create a delay ($t_{ra}$) 292 between about 70 ns and 80 ns, and the detection unit 230 can detect a change in the delay greater than or equal to a preset threshold to determine that a wiring change or a micro-probing attack has occurred.

Also, in cases where a probing attack is present in a transmission path within the shield 220, a capacitance in the order of 100 fF to 10 Pf can be added, and in cases where a wiring change attack is present, a resistance of 1 kΩ to 100 kΩ can be added. The detection unit 230 can employ a method of comparing the reference signal 250 with the output signal 260 to check the sameness of the signals, check the delays, and detect changes in the resistance and capacitance associated with the transmission paths in the shield 220.

Implementation of a Secure Semiconductor Chip According to Another Embodiment

Figure 3:
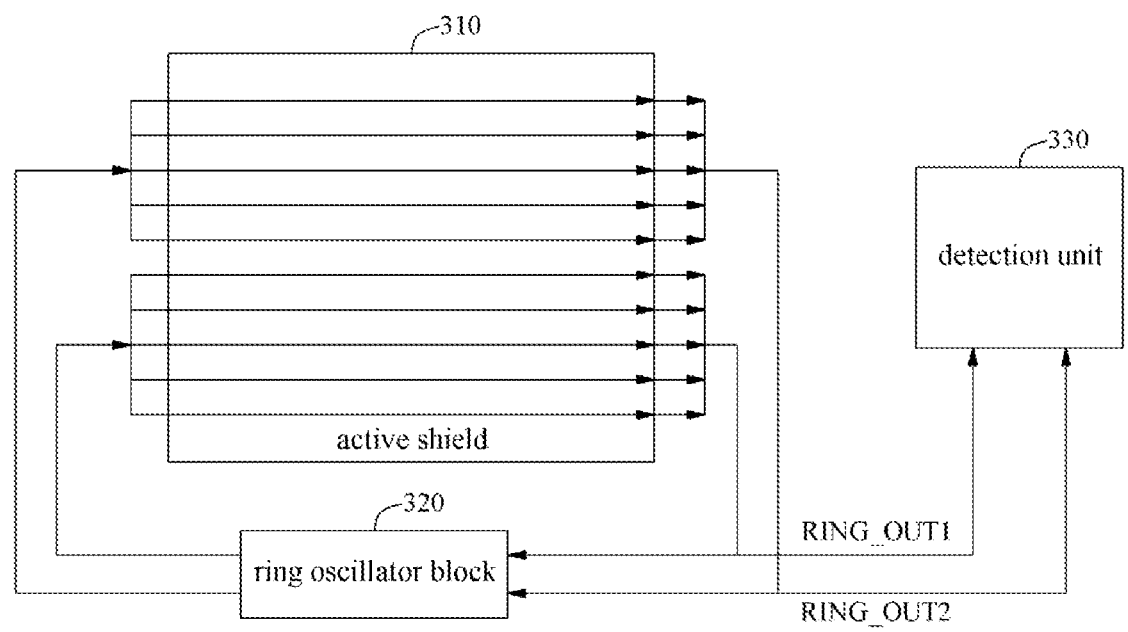
FIG. 3 is a diagram illustrating an example of a circuit for detecting a micro-probing attack on a semiconductor chip according to another embodiment of the invention.

FIG. 3 is a diagram illustrating an example of a circuit for detecting a micro-probing attack on a semiconductor chip according to another embodiment of the invention. Referring to FIG. 3, the semiconductor chip can include an active shield 310, a ring oscillator block 320, and a detection unit 330. Regarding the active shield 310, the description of the active shield 110 provided above with reference to FIG. 1 applies in the same manner, and as such, redundant descriptions are omitted.

The ring oscillator block 320 can include two ring oscillators of which synchronization is possible. Each ring oscillator can be synchronized according to a reset signal outputted from the detection unit 330. Also, each of the synchronized ring oscillators can generate clock signals having the same phase and the same delay with respect to a transferred signal.

The ring oscillator block 320 can transfer a first output signal outputted from the first ring oscillator to a first area in the active shield 310. Likewise, the ring oscillator block 320 can transfer a second output signal outputted from the second ring oscillator to a second area in the active shield 310. Although the embodiment described with reference to FIG. 3 is illustrated using an example in which the five metal lines at the top, from among the ten metal lines included in the active shield 310, are designated as the first area and the five metal lines at the bottom are designated as the second area, this is merely an example and must not be interpreted as restricting or limiting the scope of other embodiments.

The ring oscillator block 320 can transfer a first return signal (RING_OUT1), which is transferred passing through the first area of the active shield 310, and a second return signal (RING_OUT2), which is transferred passing through the second area of the active shield 310, to the detection unit 330. If an attacker attempts micro-probing with a probing device, the delay of the return signal corresponding to the area under attack would be increased. The detection unit 230 can compare the output signals of at least two synchronized ring oscillators to detect any desynchronization by micro-probing, and if an attack is detected, can output a detection signal. The procedures by which the detection unit detects a micro-probing attack on the semiconductor chip are described below in further detail, with reference to a block diagram of the semiconductor chip.

Figure 4A:
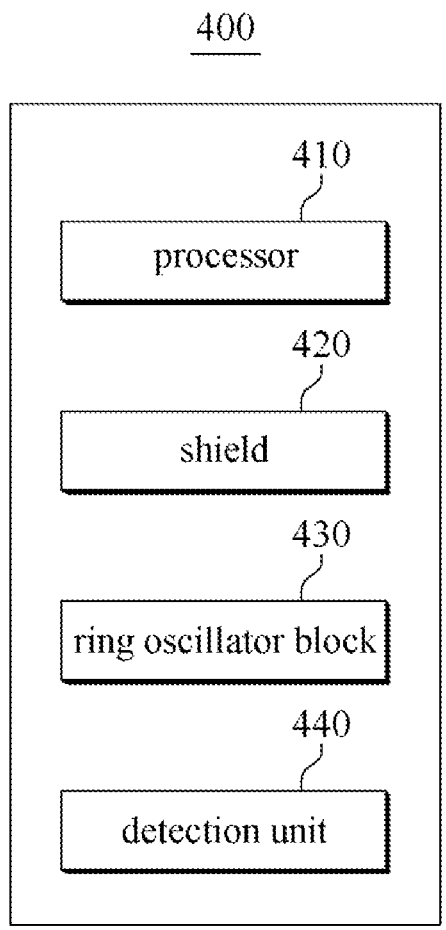
FIG. 4A is a block diagram of the semiconductor chip illustrated in FIG. 3.

FIG. 4A is a block diagram of the semiconductor chip illustrated in FIG. 3. Referring to FIG. 4A, the semiconductor chip 400 can include a processor 410, a shield 420, a ring oscillator block 430, and a detection unit 440. Regarding the processor 410 and the shield 420, the descriptions provided above with reference to FIG. 2A apply in the same manner, and as such, redundant descriptions are omitted.

The ring oscillator block 430 can include at least two oscillators. In an embodiment of the invention, the ring oscillator block 430 can include a first ring oscillator and a second ring oscillator. The ring oscillator block 430 can provide control such that the output signal of the first ring oscillator is inputted to a port that is connected to the first area within the shield 420 and such that the output signal of the first ring oscillator passes through the first area and returns to the ring oscillator block 430. Likewise, the ring oscillator block 430 can provide control such that the output signal of the second ring oscillator is inputted to a port that is connected to the second area within the shield 420 and such that the output signal of the second ring oscillator passes through the second area to return to the ring oscillator block 430. Also, the ring oscillator block 430 can transfer each of the return signals (RING_OUT1, RING_OUT2) to the detection unit 440.

The detection unit 440 can detect whether or not there is an electric probing of the shield 420 by comparing the oscillation phases of the first ring oscillator and the second ring oscillator. The shield 420 can include a first area in which the transmission paths associated with the first ring oscillator are multiplexed in parallel and a second area in which the transmission paths associated with the second ring oscillator are multiplexed in parallel.

The detection unit 440 can transfer a reset signal to the ring oscillator block 430 if the phases of the two return signals are identical, thus providing control to periodically synchronize the first ring oscillator and the second ring oscillator. The first ring oscillator and the second ring oscillator can generate clock signals having the same phase according to the reset signal.

Figure 4B:
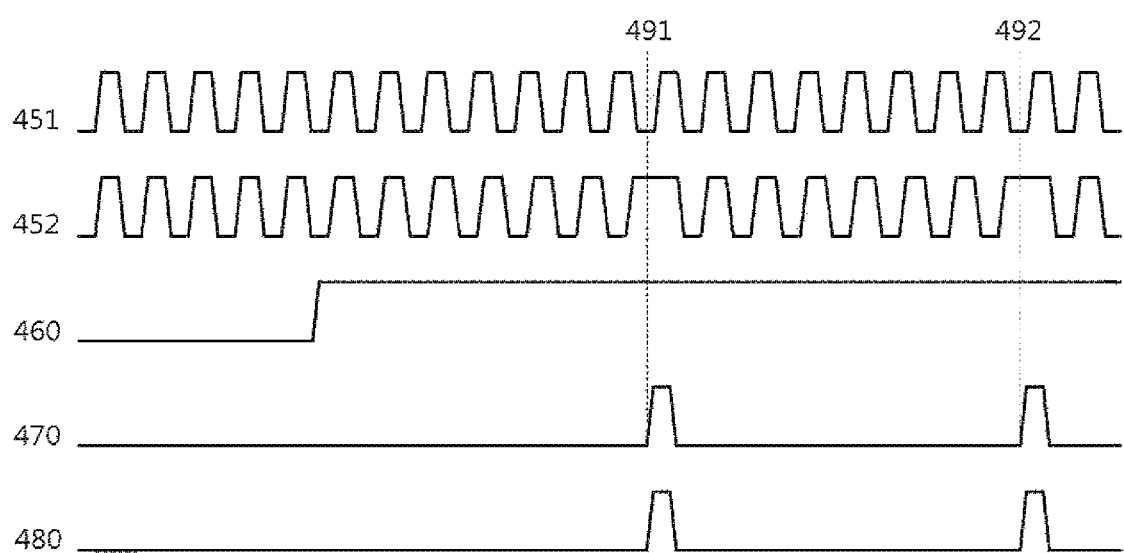
FIG. 4B is a diagram illustrating an example of detecting a micro-probing attack made to a semiconductor chip by comparing the return signals of at least two ring oscillators.

FIG. 4B is a diagram illustrating an example of detecting a micro-probing attack made to a semiconductor chip by comparing the return signals of at least two ring oscillators. In FIG. 4B, there are illustrated two return signals 451, 452, an attack signal 460 associated with micro-probing, a detection signal 470, and a reset signal 480, measured along the same time axis. The detection unit 440 can detect a probing attack on the semiconductor chip 400 by comparing the two return signals 451, 452 transferred from the respective ring oscillators. In an embodiment of the invention, a suitable frequency for a return signal can be set between 100 kHz and 999 kHz.

The signals outputted by two ring oscillators can be synchronized according to the reset signal 480 transferred from the detection unit 440. For example, there can be a situation in which an attacker performs a micro-probing attack on the second area, which may be associated with the second ring oscillator. In this case, the output signal by the second ring oscillator would experience an increase in phase delay in the second return signal 452 due to the additional capacitance caused by the probing device in the oscillation path. As a result of such phase delay, the frequency of the second return signal 452 would be decreased. The detection unit 440 can detect a probing attack by from the time points 491, 492 at which the frequency decreases in the second return signal 452.

Since the two ring oscillators were synchronized according to the reset signal 480, the two return signals 451, 452 would operate at the same frequency if there are no probing attacks. However, if there is a probing attack, the second return signal 452 corresponding to the attacked area would have the frequency slowed down compared to the first return signal 451.

Accordingly, the first return signal 451 and the second return signal 452, having similar phases after a falling triggered by a first reset signal, can be made to have opposite phases again after 6 cycles, and the detection unit 440 can detect an attack by using such phase difference.

Figure 5:
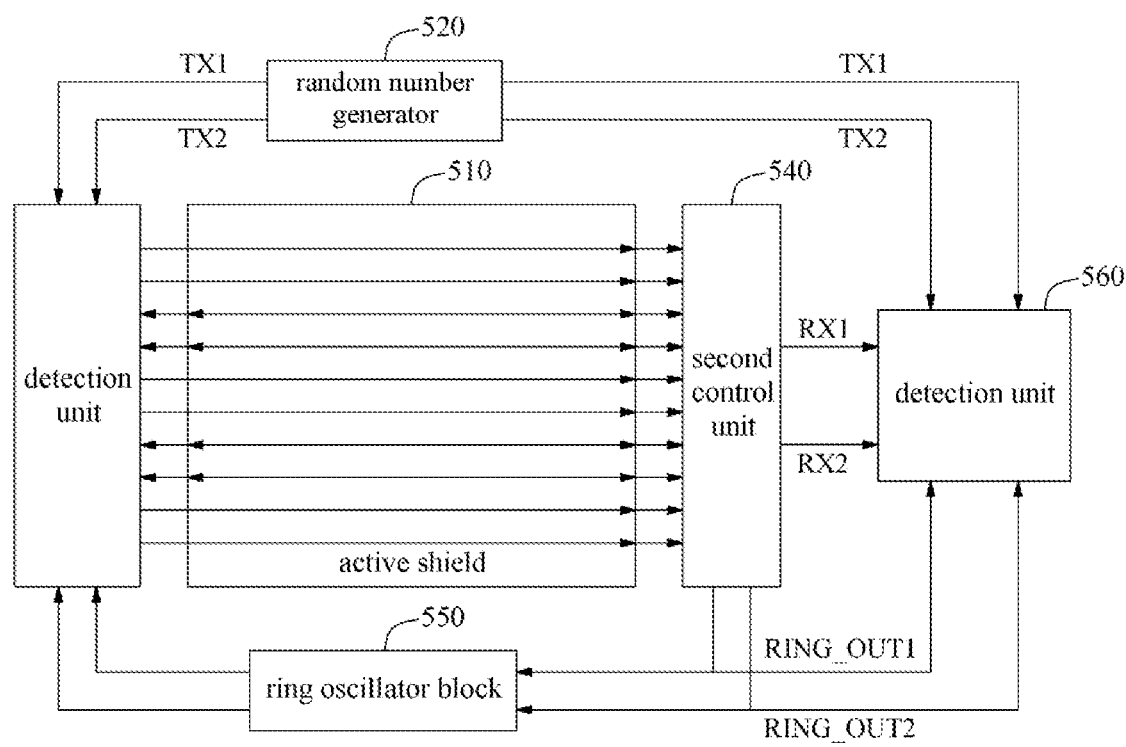
FIG. 5 is a diagram illustrating an example of an integrated circuit for protecting a semiconductor chip according to yet another embodiment of the invention.

Implementation of a Secure Semiconductor Chip According to Yet Another Embodiment FIG. 5 is a diagram illustrating an example of an integrated circuit for protecting a semiconductor chip according to yet another embodiment of the invention. Referring to FIG. 5, the semiconductor chip can include an active shield 510, a random number generator 520, a first control unit 530, a second control unit 540, a ring oscillator block 550, and a detection unit 560. The active shield 510 can refer to the uppermost metal lines for protecting the integrated circuit within the chip from physical attacks for reverse engineering. The first control unit 530 and the second control unit 540 can, according to the protection mode of the semiconductor chip, support one of a first mode for detecting a wiring change and a second mode for detecting micro-probing. The procedures for selecting from multiple protection modes of the semiconductor chip are described below in further detail, with reference to FIG. 6.

If the first mode for detecting a wiring change is selected, the random number generator 520 can transmit the same reference signals TX1, TX2 to the first control unit 530 and the detection unit 560. The first control unit 530 can, according to the first mode, provide control such that the transferred reference signals TX1, TX2 are passed through the active shield 510. Also, the random number generator 520 can generate a configuration signal with which the first control unit 530 and the second control unit 540 can change the routing topology in the active shield 510. The random number generator 520 can transfer the generated configuration signal to the first control unit 530 and second control unit 540. The configuration signal can be a control signal for changing the routing topology and can refer to a signal that is generated independently from the reference signals TX1, TX2 used directly for detecting a wiring change.

The detection unit 560 can compare the reference signals TX1, TX2 that have been transferred directly from the random number generator 520 with the output signals RX1, RX2 that have been transferred after passing through the active shield 510. According to the comparison result, the detection unit 560 can detect changes in the upper wiring of the semiconductor chip.

If the second mode for detecting a micro-probing attack is selected, the first control unit 530 can provide control such that the two output signals transferred from the ring oscillator block 550 pass through designated areas of the active shield 510. Also, the second control unit 540 can transfer the two return signals, which have returned after passing through the corresponding parts of the active shield 510, to the ring oscillator block 550 and the detection unit 560. The detection unit 560 can detect a probing attack on the semiconductor chip by a method of comparing the oscillation phases of the two return signals, as already described above.

Figure 6:
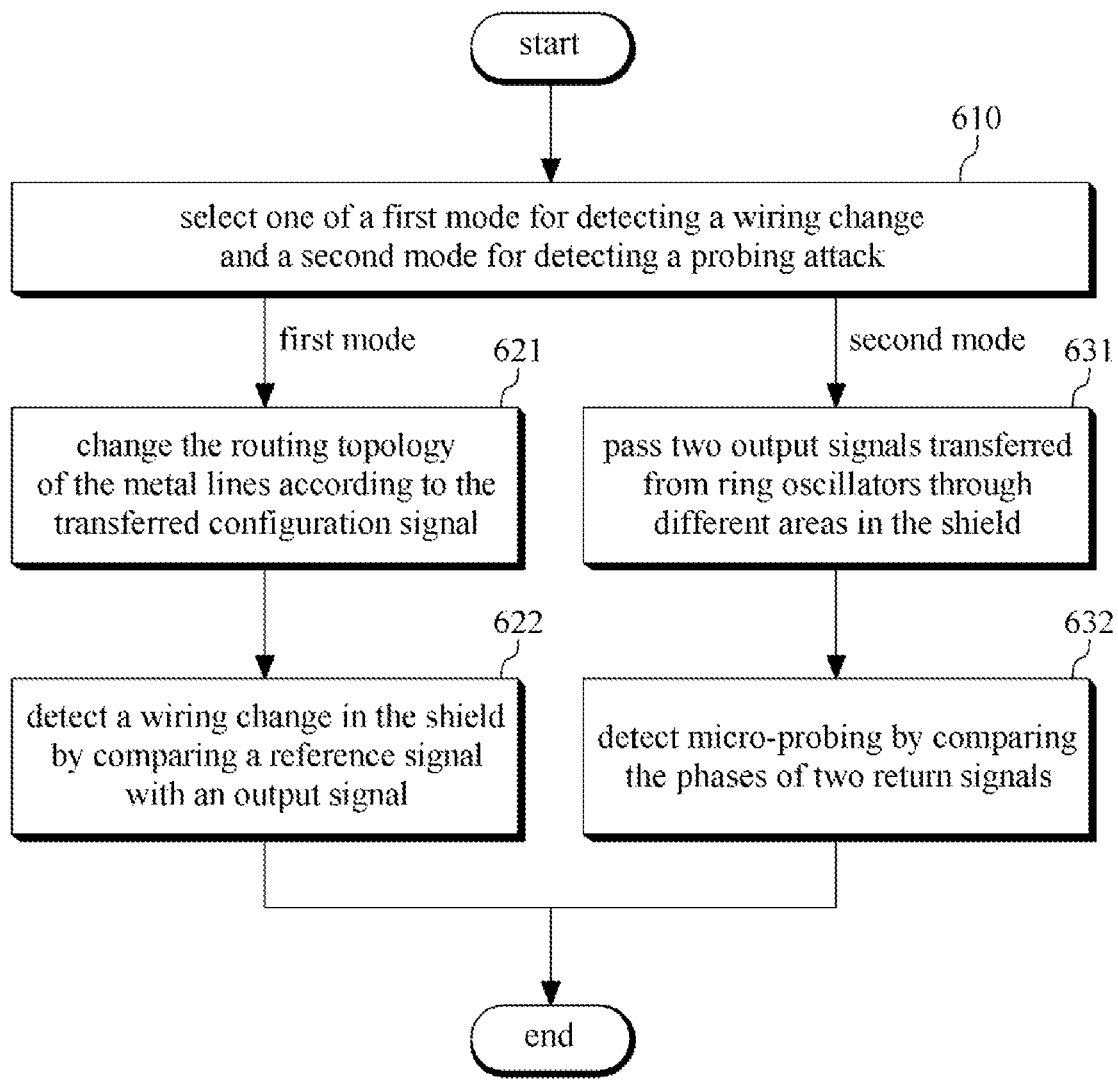
FIG. 6 is a flow diagram of an operation method for a semiconductor chip that supports multiple modes.

FIG. 6 is a flow diagram of an operation method for a semiconductor chip that supports multiple modes. The operation method for a semiconductor chip that supports multiple modes can include a step 610 of selecting one of a first mode for detecting a wiring change and a second mode for detecting a probing attack, and if the first mode is selected, a step 621 of changing the routing topology of the metal lines according to a transferred configuration signal and a step 622 of detecting a wiring change in the shield by comparing a reference signal with an output signal, or if the second mode is selected, a step 631 of passing two output signals transferred from ring oscillators through different areas in the shield and a step 632 of detecting micro-probing by comparing the phases of the two return signals.

In step 610, a control unit included in the semiconductor chip can select the protection mode for the semiconductor chip. More specifically, the control unit can select either one of a first mode for detecting a wiring change and a second mode for detecting a probing attack. In another embodiment of the invention, the control unit can repeatedly change the operation mode, from the first mode to the second mode or from the second mode to the first mode, according to a time period designated beforehand.

When the first mode is selected, in step 621, the control unit can transfer a configuration signal, transferred from the random number generator, to a chopper array so as to change the routing topology of the metal lines in the shield. Also, in step 622, the detection unit included in the semiconductor chip can compare a reference signal, which is transferred directly from the random number generator, with the output signal to detect any wiring change in the shield. Regarding the specific details of step 621 and step 622, the descriptions related to the semiconductor chip provided above with reference to FIG. 2A and FIG. 4A apply in the same manner, and as such, redundant descriptions are omitted.

When the second mode is selected, in step 631, the control unit can pass two output signals transferred from the ring oscillators through different areas in the shield. Also, in step 632, the detection unit included in the semiconductor chip can detect micro-probing by comparing the phases of the two return signals outputted by way of the control unit. Regarding the specific details of step 631 and step 632, the descriptions related to the semiconductor chip provided above with reference to FIG. 2A and FIG. 4A likewise apply in the same manner, and as such, redundant descriptions are omitted.

The embodiments described above can be implemented as hardware components, software components, and/or combinations of hardware and software components. For example, the device, method, and components in the embodiments described above can be implemented by using one or more general purpose computer or special purpose computer, which may include, for example, a processor, a controller, an ALU (arithmetic logic unit), a digital signal processor, a microcomputer, a FPGA (field programmable gate array), a PLU (programmable logic unit), a microprocessor, or any other device capable of executing and responding to instructions. The processing device can run an operating system (OS) and one or more software applications that are executed on the operating system. Also, the processing device can access, store, manipulate, process, and create data in response to the execution of the software. Although, for the sake of easier understanding, the descriptions may have referred to a single processing device being used, the person having ordinary skill in the relevant field of art would know that the processing device can include multiple processing elements and/or multiple types of processing elements. For example, the processing device can include a multiple number of processors or one processor and one controller. Also, other processing configurations are possible, such as one employing parallel processors.

The software can include a computer program, code, instructions, or a combination of one or more of the above to configure a processing device to operate as desired or command a processing device independently or collectively. The software and/or data can be permanently or temporarily embodied as a type of machinery, component, physical device, virtual equipment, computer storage medium or device, or transmitted signal wave to be interpreted by a processing device or to provide instructions or data to a processing device. The software can also be distributed over computer systems connected over a network and can be stored or executed in a distributed manner. The software and data can be stored on one or more computer-readable recorded medium.

A method based on an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the computer-readable medium can be designed and configured specifically for the embodiment or can be a type known to and used by the skilled person in the field of computer software. A computer-readable medium may include a hardware device that is specially configured to store and execute program instructions. Some examples may include magnetic media such as hard disks, floppy disks, and magnetic tapes, optical media such as CD-ROM's and DVD's, magneto-optical media such as floptical disks, and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments, and vice versa.

While the embodiments of the invention are described above with reference to a limited number of drawings, a person having ordinary skill in the relevant field of technology would be able to apply various technical modifications and alterations based on the disclosure provided above. A satisfactory result may be achieved, for example, by performing the procedures described above in an order different from that of a method described above and/or by coupling or combining components of the above-mentioned systems, structures, devices, circuits, etc., in a form different from that described above or replacing or substituting certain components with other components or equivalents.

What is claimed is:

1. A semiconductor chip comprising:
   a processor configured to process data;
   a shield arranged over an upper portion of the processor, the shield comprising a metal line;
   a ring oscillator block configured to pass an output of a first ring oscillator through a first area of the shield to return the output of the first ring oscillator to an input of the first ring oscillator and configured to pass an output of a second ring oscillator through a second area of the shield to return the output of the second ring oscillator to an input of the second ring oscillator, the second ring oscillator synchronized with the first ring oscillator; and
   a detection unit configured to detect whether or not there is an electrical probing of the shield by comparing oscillation phases of the first ring oscillator and the second ring oscillator, wherein a difference in the oscillation phases of the first ring oscillator and the second ring oscillator indicates the electrical probing of the shield.

2. The semiconductor chip of claim 1, wherein transmission paths of the first ring oscillator are multiplexed in parallel in the first area, and transmission paths of the second ring oscillator are multiplexed in parallel in the second area.

3. The semiconductor chip of claim 1, wherein the detection unit transfers a reset signal to the ring oscillator block to periodically synchronize the first ring oscillator and the second ring oscillator.

4. The semiconductor chip of claim 3, wherein the first ring oscillator and the second ring oscillator generate clock signals having a same phase according to the reset signal.

5. A semiconductor chip comprising:
   a processor configured to process data;
   a shield arranged over an upper portion of the processor, the shield comprising a metal line;
   a detection unit configured to detect whether or not there is at least one of a wiring change in the shield and an electrical probing of the shield; and
   a controller configured to select a mode from among a first mode for detecting a wiring change in the shield and a second mode for detecting an electrical probing of the shield and transfer a signal corresponding to the selected mode to the detection unit.

6. The semiconductor chip of claim 5, wherein, if the first mode is selected, the controller sets a routing topology of the metal line to a first state and sets the routing topology to a second state changed from the first state, and the detection unit detects whether or not there is a wiring change in the shield by comparing a transferred reference signal with an output signal, the output signal being the reference signal outputted after passing through the shield.

7. The semiconductor chip of claim 6, further comprising:
   a random number generator configured to provide a configuration signal directing the controller to set the routing topology,
   wherein the controller comprises at least one chopper array capable of changing the routing topology according to the configuration signal provided by the random number generator.

8. The semiconductor chip of claim 5, further comprising:
   a ring oscillator block configured to pass an output of a first ring oscillator through a first area of the shield to return the output of the first ring oscillator to an input of the first ring oscillator and configured to pass an output of a second ring oscillator through a second area of the shield to return the output of the second ring oscillator to an input of the second ring oscillator, the second ring oscillator synchronized with the first ring oscillator,
   wherein, if the second mode is selected, the controller provides control such that output signals from the first ring oscillator and the second ring oscillator each passes through a corresponding area to be transferred to the detection unit.

* * * * *